United States Patent [19]
Schwab et al.

[11] 3,860,842
[45] Jan. 14, 1975

[54] ELECTROMAGNETIC ROTATIVE STEP BY STEP MOTOR

[75] Inventors: Michel Schwab, Bienne; Pierre-André Meister, Ipsach, both of Switzerland

[73] Assignee: Societe Suisse pour L'Industrie Horlogere Management Services S.A., Bienne, Switzerland

[22] Filed: Nov. 23, 1973

[21] Appl. No.: 418,740

[30] Foreign Application Priority Data
Nov. 30, 1972 Switzerland.................. 17503/72

[52] U.S. Cl................................. 310/49, 310/268
[51] Int. Cl. .......................................... H02k 37/00

[58] Field of Search.......... 310/49 R, 268, 162–164, 310/156

[56] References Cited
UNITED STATES PATENTS
3,739,206    6/1973    Schwarzmuller et al. ............ 310/49

*Primary Examiner*—Donovan F. Duggan
*Attorney, Agent, or Firm*—Silverman & Cass, Ltd.

[57] ABSTRACT

An electromagnetic step by step motor which is insensitive to external magnetic fields wherein the pole shoes and the magnetic poles of the motor are provided in numbers according to a mathematical relationship.

1 Claim, 6 Drawing Figures

ELECTROMAGNETIC ROTATIVE STEP BY STEP MOTOR

BACKGROUND OF THE INVENTION

The present invention relates to an electromagnetic rotative step by step motor, energized by successive pulses of opposite polarity, comprising a rotor having alternating magnetic poles.

DESCRIPTION OF THE PRIOR ART

Such motors are known per se. They need, so as to be insensitive to the effects of external magnetic fields, to be provided with a protection sheltering them from these fields.

The object of the invention is to provide a motor of this type which is insensitive to the effects of such external magnetic fields, whilst avoiding the use of a shielding member.

To this end, the motor according to the invention is provided with a plurality of pairs of pole shoes, each pair defining an air gap, the number of pairs of pole shoes being equal to $2^n$, $n$ being equal to or higher than 1, and the number of the magnetic poles of the motor being equal to $3 \times 2^n$, the pole shoes being arranged such that the number of magnetic poles of the rotor present in the air-gaps, at the stable rest positions of the motor, is equal to $2 \times 2^n$.

SUMMARY OF THE INVENTION

An electromagnetic step by step motor wherein the number of pole shoes is $2^n$, the number of magnetic poles is $3 \times 2^n$, and the number of magnetic poles in the air gaps at rest positions of the motor is $2 \times 2^n$, whereby the motor is rendered insensitive to external magnetic fields.

BRIEF DESCRIPTION OF THE DRAWINGS

The drawing shows, by way of example, one embodiment of the object of the invention.

DESCRIPTION OF THE PREFERRED EMBODIMENT

Figure 1:
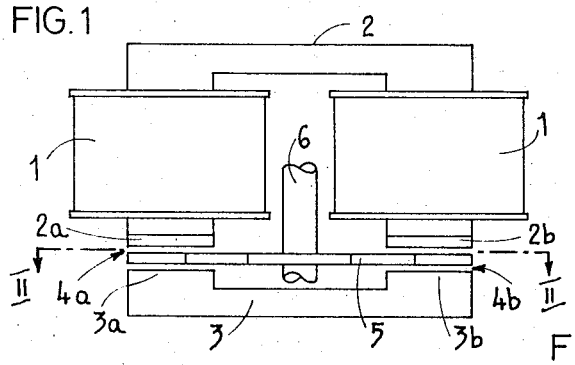
FIG. 1 is an elevational view of a rotative electromagnetic step by step motor.
Figure 2:
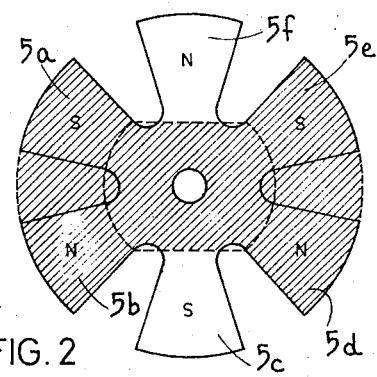
FIG. 2 is a sectional view along line II—II of FIG. 1.

The motor represented in FIGS. 1 and 2 comprises two stationary coils 1 traversed by a U-shaped yoke 2 constituting the magnetic circuit terminating in two pole shoes 2a and 2b.

The magnetic field is closed by an armature 3 terminating in two pole shoes 3a, respectively 3b, The free space between the pole shoes 2a and 2b on the one hand and the pole shoes 3a and 3b on the other hand, constituting the air-gaps 4a and 4b, is occupied by a rotor 5 carried by the shaft 6 of the motor. This rotor comprises a thin disc made of a material having a high coercive field and provided with six vanes ($3 \times 2^n$, for $n = 1$) 5a to 5f.

These vanes are alternatively polarized north and south, as indicated in FIG. 2, the field vector being parallel to the axis of the rotor. The hatched zone of FIG. 2 represents the portion of the rotor which, when seen in plan view, is covered by the pole shoes, this hatched zone including four vanes ($2^n$) of the rotor.

Figure 3:
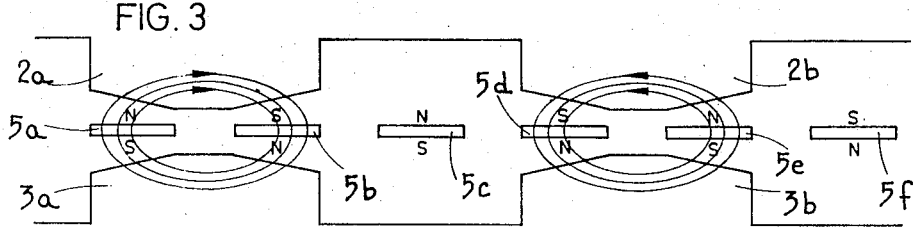
FIGS. 3 to 6 are diagrammatic representations of the pole shoes of the rotor of the motor in different operating positions.

The rotor 5 being represented in FIGS. 2 and 3 in one of its stable balanced positions, one sees that its position is such that the loop of the magnetic field given by two successive magnetic poles is closed with a minimum reluctance.

Figure 4:
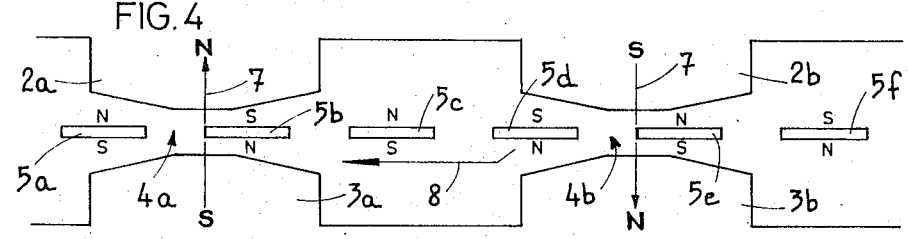

When a pulse, for instance positive, producing a magnetic field diagrammatically represented by the arrows 7 in FIG. 4 is applied to the rotor, the pole shoes receive the polarity indicated in this figure. The configuration of the pole shoes is such that the magnetic pole designated by 5a of the rotor is pushed out from the air-gap 4a, the pole designated by 5b being attracted into this air-gap, thus advancing the rotor one step in the sense of the arrow 8.

For the second pair of pole shoes, that is to say for the air-gap 4b, the phenomenon is the same, the only difference being that all the polarities are reversed.

Figure 5:
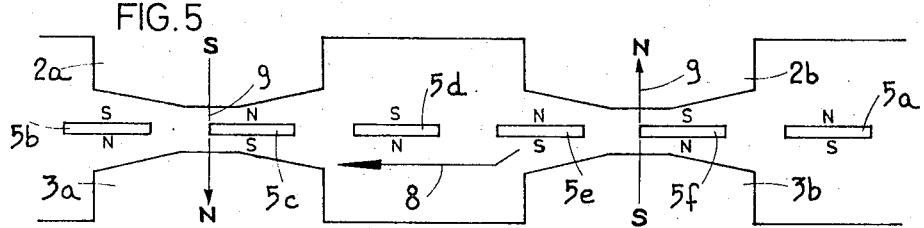

When a negative pulse occurs, producing a field as diagrammatically represented by the arrows 9, the configuration being that of FIG. 5, urging the rotor to advance a new step, in the same sense as previously indicated by the arrow 8.

Figure 6:
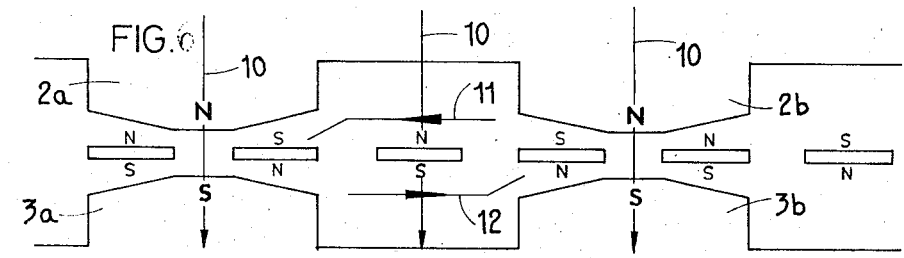

FIG. 6 illustrates, diagrammatically, the behaviour of the present motor when it is surrounded by an external magnetic field, this latter being represented by the arrows 10, parallel to the axis of the rotor. The pole shoes then are influenced by the polarity represented in FIG. 6 and one sees, as indicated by the arrows 11 and 12, that the effect on the rotor, of the first pair of pole shoes 2a, 3a, is the same as that of the second pair 2b, 3b but in the opposite direction. Thus taking into account the symmetry of the arrangement, the effect of an external magnetic field counter-balances itself at the level of the rotor. It is necessary, therefore, that the number of the vanes of the rotor situated in the air-gaps 4a and 4b be equal to $2 \times 2^n$, if the number of the pairs of pole widenings is of $2^n$ and the number of the poles of the rotor of $3 \times 2^n$, $n$ being equal to or higher than 1.

In the example as represented, the number of the pairs of pole shoes is two, the number of the magnetic poles of the rotor six, and the number of the magnetic poles present in the air-gaps four, $n$ being then equal to one.

What it is desired to secure by Letters Patent of the United States is:

1. A rotative electromagnetic step by step motor, energized by successive pulses of opposite polarity, comprising a rotor having alternating magnetic poles, a plurality of pairs of pole shoes, each pair defining an air gap, the number of pairs of pole shoes being equal to $2^n$, $n$ being at least 1, and the number of the magnetic poles of the motor being equal to $3 \times 2^n$, the pole shoes being arranged such that the number of magnetic poles of the rotor present in the air gaps, at the stable rest positions of the motor, is equal to $2 \times 2^n$.

* * * * *